(12) United States Patent
Song et al.

(10) Patent No.: US 8,597,396 B1
(45) Date of Patent: Dec. 3, 2013

(54) METAL NANODISKS USING BICELLAR TEMPLATES

(75) Inventors: Yujiang Song, Albuquerque, NM (US); John A. Shelnutt, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 1091 days.

(21) Appl. No.: 12/185,153

(22) Filed: Aug. 4, 2008

Related U.S. Application Data

(60) Provisional application No. 61/048,768, filed on Apr. 29, 2008.

(51) Int. Cl.
*B22F 1/00* (2006.01)
*B22F 1/02* (2006.01)
*C22C 1/05* (2006.01)

(52) U.S. Cl.
USPC .............................................. 75/255; 75/370

(58) Field of Classification Search
USPC ................................................... 75/255, 370
See application file for complete search history.

(56) References Cited

U.S. PATENT DOCUMENTS 7,374,599 B1   5/2008   Shelnutt et al.

OTHER PUBLICATIONS

Chen et al. (Silver Nanodisks: Synthesis, Characterization and Self-Assembly, Mat. Res. Soc. Symp. Proc. vol. 740, 2003).*
Mandal et al. (Silver Nanoparticles of Variable Morphology Synthesized in Aqueous Foams as Novel Templates, Bull. Mater. Sci., vol. 28, No. 5, Aug. 2005, pp. 503-510).*
Yujiang Song et al, "Synthesis of Platinum Nanocages by Using Liposomes Containing Photocatalyst Molecules" Agnew. Chem. Int. Ed., 2006, vol. 45, pp. 8126-8130.
Yujiang Song et al, "Foamlike Nanostructures Created from Dendritic Platinum Sheets on Liposomes", Chem. Mater, 2006, vol. 18, pp. 2335-2346.
Yujiang Song et al, "Synthesis of Platinum Nanowire Networks Using a Soft Template", Nano Letters, 2007 vol. 7, No. 12 pp. 3650-3655.
Yujiang Song et al, "Controlled Synthesis of 2-D and 3-D Dendritic Platinum Nanostructures", Journal of American Chemical Society, 2004, vol. 126, pp. 635-645.
U.S. Appl. No. 11/542,506, filed, Oct. 3, 2006.
U.S. Appl. No. 11/840,067, a divisional, filed Aug. 16, 2007.

* cited by examiner

*Primary Examiner* — Weiping Zhu
(74) *Attorney, Agent, or Firm* — Carol I. Ashby

(57) ABSTRACT

Metallic nanodisks and a method of making them. The metallic nanodisks are wheel-shaped structures that that provide large surface areas for catalytic applications. The metallic nanodisks are grown within bicelles (disk-like micelles) that template the growth of the metal in the form of approximately circular dendritic sheets. The zero-valent metal forming the nanodisks is formed by reduction of a metal ion using a suitable electron donor species.

16 Claims, 6 Drawing Sheets

US 8,597,396 B1

METAL NANODISKS USING BICELLAR TEMPLATES

This patent application claims priority benefit from U.S. provisional patent application Ser. No. 61/048,768, filed on Apr. 29, 2008, which is incorporated herein by reference.

CROSS-REFERENCE TO RELATED APPLICATIONS

"Method of Photocatalytic Nanotagging," U.S. patent application Ser. No. 11/542,506, filed on Oct. 3, 2006, which is incorporated herein by reference.

The United States Government has rights in this invention pursuant to Department of Energy Contract No. DE-AC04-94AL85000 with Sandia Corporation.

BACKGROUND OF THE INVENTION

This invention relates to metallic nanostructures whose structure is controlled during the growth process by controlled reductive deposition of metal within a templating bicelle.

An equimolecular complex between a carboxylic acid and an alkylamine where the number of carbon atoms is greater than or equal to seven is commonly termed a catanionic surfactant. A catanionic surfactant may consist of cationic and anionic surfactants with equal numbers of carbon atoms in their alkyl chains or with unequal numbers of carbon atoms in their alkyl chains. The alkyl portions may be partially or completely fluorinated. In water, these materials can form a variety of phases. A bicelle phase can be formed with an appropriate molar ratio of the anionic and cationic surfactants. More generally, a catanionic surfactant consists of any oppositely charged paired surfactant ions acting as counterions to each other.

An example of a catanionic system is the combination resulting from combining salts of cetyltrimethylammonium (CTA) and perfluorooctanoate ($FC_7$). Jung et al. have discussed the physics determining the equilibrium structural composition of a catanionic solution, "H.-T. Jung, L. Y. Lee, E. W. Kaler, B. Coldren, and J. A. Zasakzinski, "Gaussian curvature and the equilibrium among bilayer cylinders, spheres, and discs," Proc. Nat. Acad. Sci. Vol. 99 (2002) pp 15318-15322. The nanodisks (bicelles) formed using the bromide salt of CTA (CTAB) and the sodium salt of $FC_7$ were reported to be quite small and relatively monodisperse (35±4 and 33±6 nm) for the CTAB/$FC_7$ ratios forming appreciably numbers of bicellar disks.

BRIEF DESCRIPTION OF THE DRAWINGS

The accompanying drawings, which are incorporated in and form part of the specification, illustrate some embodiments of the present invention and, together with the description, serve to explain the principles of the invention.

FIG. 1b is an enlarged view of a portion of FIG. 1b.

FIG. 2b presents the Pt density across the boxed region in FIG. 2a.

DETAILED DESCRIPTION OF THE INVENTION

Figure 1A:
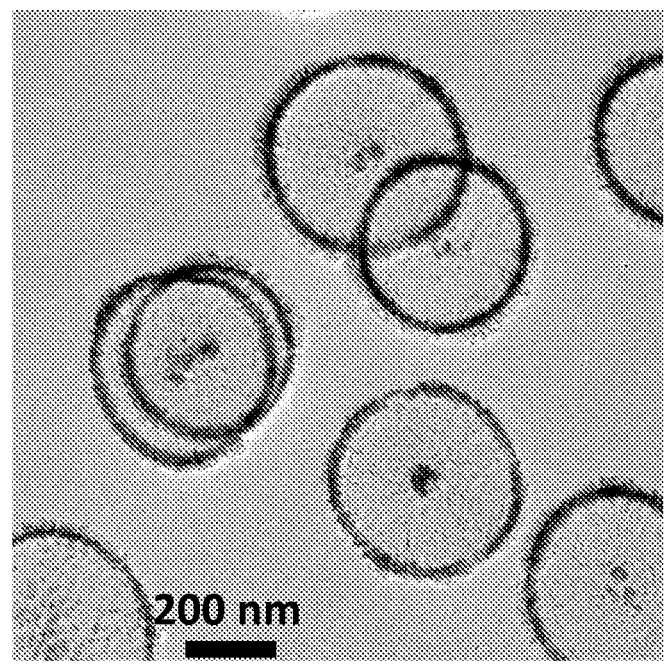
FIGS. 1a and 1b present transmission electron micrographs (TEMs) of metal nanodisks showing the central hub-like structure, the dendritic metal nanosheets extending therefrom, and the rim-like structure circumscribing the dendritic metal nanosheets.

This invention comprises metallic nanodisks and a method of making them. The metallic nanodisks are wheel-shaped structures that that provide large surface areas for many applications, including catalytic applications. The metallic nanodisks are grown within bicelles (disk-like micelles) that template the growth of the metal in the form of approximately circular dendritic sheets with a central hub-like structure. The zero-valent metal forming the nanodisks is formed by reduction of a metal ion using a suitable electron donor species.

In embodiments of this invention, nanodisks are made by reducing a metal salt in the presence of bicelles that serve as templates to control the structure of the metal nanostructures formed by the reduction reaction. Template bicelles are obtained by combining an anionic surfactant and a cationic surfactant. The surfactants can combine to form a catanionic surfactant that forms substantially flat disk-like bicelles. Reduction is initiated at the center of the bicelle, as evidenced by the approximate centering of the hub-like portion of the nanodisk and by the approximately radial growth of the dendritic metal nanosheet that forms. The growth of the dendritic metal nanosheet is confined substantially within the bilayer of the bicelle. The bicellar template is approximately uniform in thickness. The dendritic metal nanosheet forming therein is also approximately uniform in thickness. In some embodiments, a metal salt is added first to a solution of the template bicelles. For the purpose of this invention the term metal salt also includes metal complexes. In these embodiments, the reducing agent is subsequently added to a reaction solution comprising the solution of template bicelles and the metal salt. In other embodiments, the reducing agent may be first combined with the solution of template bicelles to form a reaction solution, and subsequently the metal salt or a solution of the metal salt may be added to the reaction solution. For some embodiments, the bicellar template may be removed after metal deposition by rinsing with a suitable solvent, wherein the suitable solvent may comprise one or more solvents.

Some possible reducing agents include electron-donor species such as ascorbic acid and its salts, oxalic acid and its salts, malic acid and its salts, citric acid and its salts, ethylenediaminetetraacetic acid and its salts, triethanolamine, triethylamine, and nitrite.

In some illustrative embodiments, the catanionic surfactant employed is a mixture of cetyltrimethylammonium bromide (CTAB) and sodium perfluorooctanoate. Other catanionic surfactants may be used that form bicelles similar to those formed with CTA and $FC_7$. For example, cationic surfactants that may be used include but are not restricted to a cetyltrialkylammonium salt, a (1-octyl)trialkylammonium salt, a (1-decyl)trialkylammonium salt, a dodecyltrialkylammonium salt, a tetradecyltrialkylammonium salt, and an octadecyltrialkylammonium salt, wherein alkyl is methyl or ethyl. Alkyl groups containing 3 or more carbons may also be used if they can form a catanionic surfactant with a suitable anionic surfactant that in combination will form bicelles. Other cationic surfactants, including but not restricted to a cetylpyridinium salt, a benzalkonium salt, a benzethonium salt, polyethoxylated tallow amine, may also be used. Similarly, in some embodiments, an alternative anionic surfactant may be used provided it will form bicelles. For example, the carbon chain length of the anionic surfactant can be different from that of $FC_7$. Surfactant alkyl sulfate salts, including but not restricted to sodium dodecyl sulfate (SDS) and ammonium lauryl sulfate, may also be used.

For the formation of platinum nanodisks, some suitable Pt sources include but are not restricted to $PtCl_4^{2-}$ and $PtCl_6^{2-}$, $[Pt(NH_3)_6]Cl_4$, $Pt(NH_3)_2Cl_2$, $Pt(SCN)_6^{2-}$, and $Pt(NH_3)_4Cl_2$. Other salts and complexes of Pt(II) and other salts and complexes of Pt(IV) may also be used.

For some embodiments of nanodisks with rims, 10 mL of 20 mM aged $K_2P_tCl_4$ stock solution was mixed with 10 mL of an aqueous solution containing 1 mM CTAB and 1 mM $FC_7$, followed by the addition of 264 mg of ascorbic acid as the reducing agent. Rimmed nanodisks result when there is a sufficient supply of Pt ions to permit growth of the dendrites out to the edge region of the bicellar template. After several minutes of reaction under ambient conditions, black precipitates are formed, leaving a transparent and colorless supernatant. For some embodiments, the reaction time was at least one hour. Aged Pt(II) solutions are prepared by dissolving $K_2PtCl_4$ in water at room temperature and allowing the solution to stand for an extended time before use. Aging the platinum solution disproportionates the complex into an equilibrium mixture of 42% $Pt(H_2O)_2Cl_2$, 53% $Pt(H_2O)Cl_3^-$, and 5% $PtCl_4^{2-}$. For the material illustrated in FIG. 4, the platinum solution was aged for more than 24 hours to establish a large concentration of $Pt(H_2O)_2Cl_2$, which is believed to be a dominant source of Pt for the subsequent reduction reaction, according to L. C. Ciacchi, W. Pompe, and A. De Vita, "Initial Nucleation of Platinum Clusters after Reduction of $K_2PCl_4$ in Aqueous Solution: A First Principles Study," J. Amer. Chem. Soc. 123 (2001) p. 7373-7380. Different solution aging times can be used as long as they are sufficiently long to permit a useful concentration of the Pt source complex to form. Salts and complexes of Pt(IV) can also be used in some embodiments.

Figure 1B:
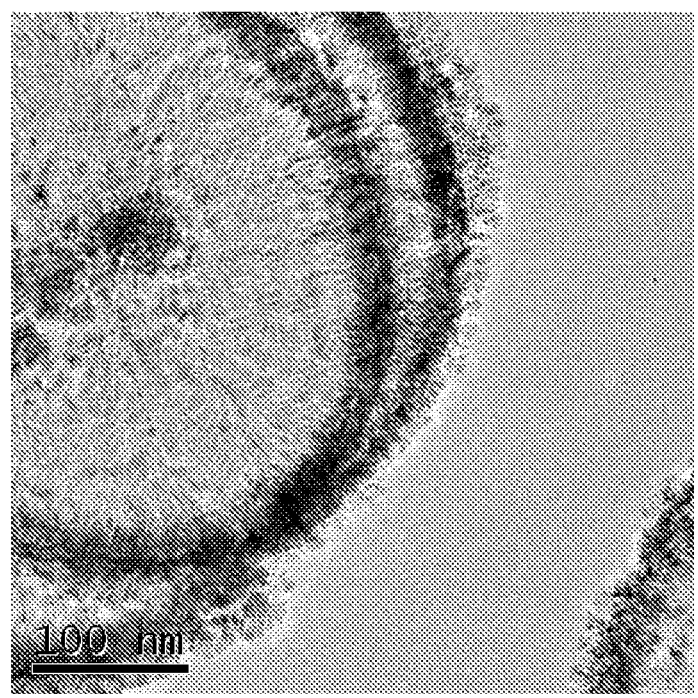

Typical nanodisks of some embodiments of this invention are presented in the transmission electron micrograph (TEM) of FIGS. 1a and 1b. The nanodisks in this figure comprise dendritic Pt with a thicker hub-like region of Pt at the center of the disk and thin, approximately flat dendritic branches of approximately uniform thickness radiating out from the center. In some embodiments, near the edge of the disk there is a region of thicker metal, giving an appearance in the TEM similar to a wheel with a rim and a center hub. The disks are relatively monodisperse in size, with disk diameters varying about 10% relative to the average diameter. An enlarged view showing the dendritic nature of the metal is presented in FIG. 1b. The nanodisks in FIG. 1a range from 375 to 458 nm in diameter, with an average diameter of 417 nm. The nanodisks used for these TEM measurements had not been rinsed with water to remove the surfactant template.

Figure 2A:
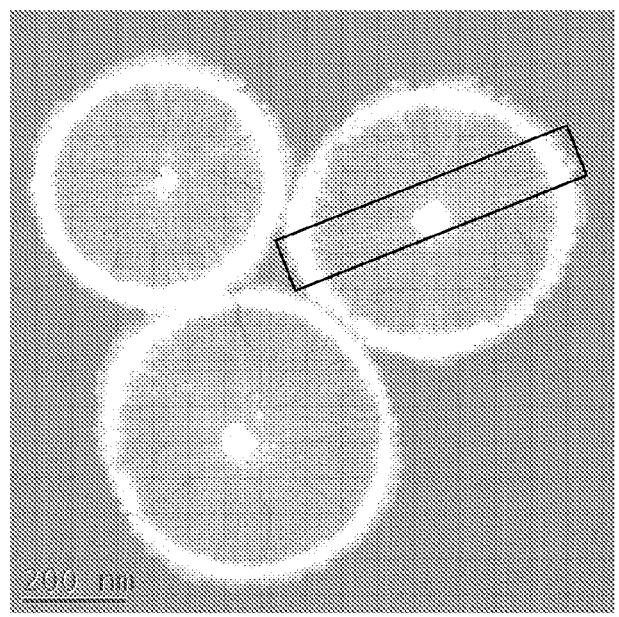
FIG. 2a presents a scanning transmission electron micrograph (STEM) of some rimmed metal nanodisks.
Figure 2B:
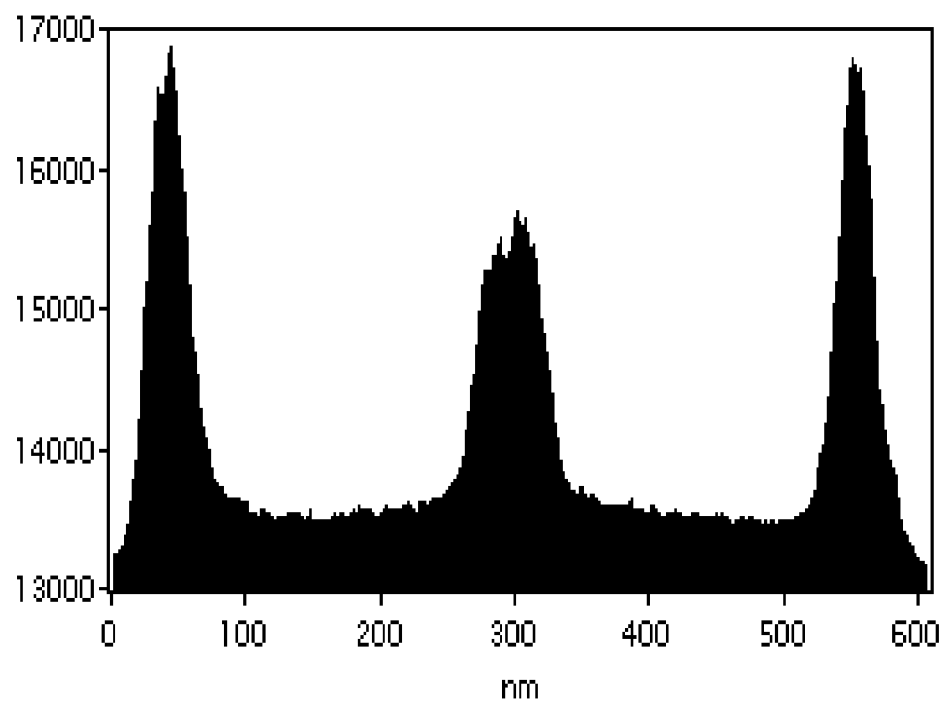

FIG. 2a presents a scanning transmission electron micrograph (STEM) of some rimmed Pt nanodisks. The box in FIG. 2a shows where the lateral Pt density profile of FIG. 2b was measured. The thicker Pt hub at the center of the nanodisk, the thinner, approximately flat dendritic region between the hub and the rim, and the thicker rim are shown in FIG. 2b.

Figures 3A, 3B, 3C:
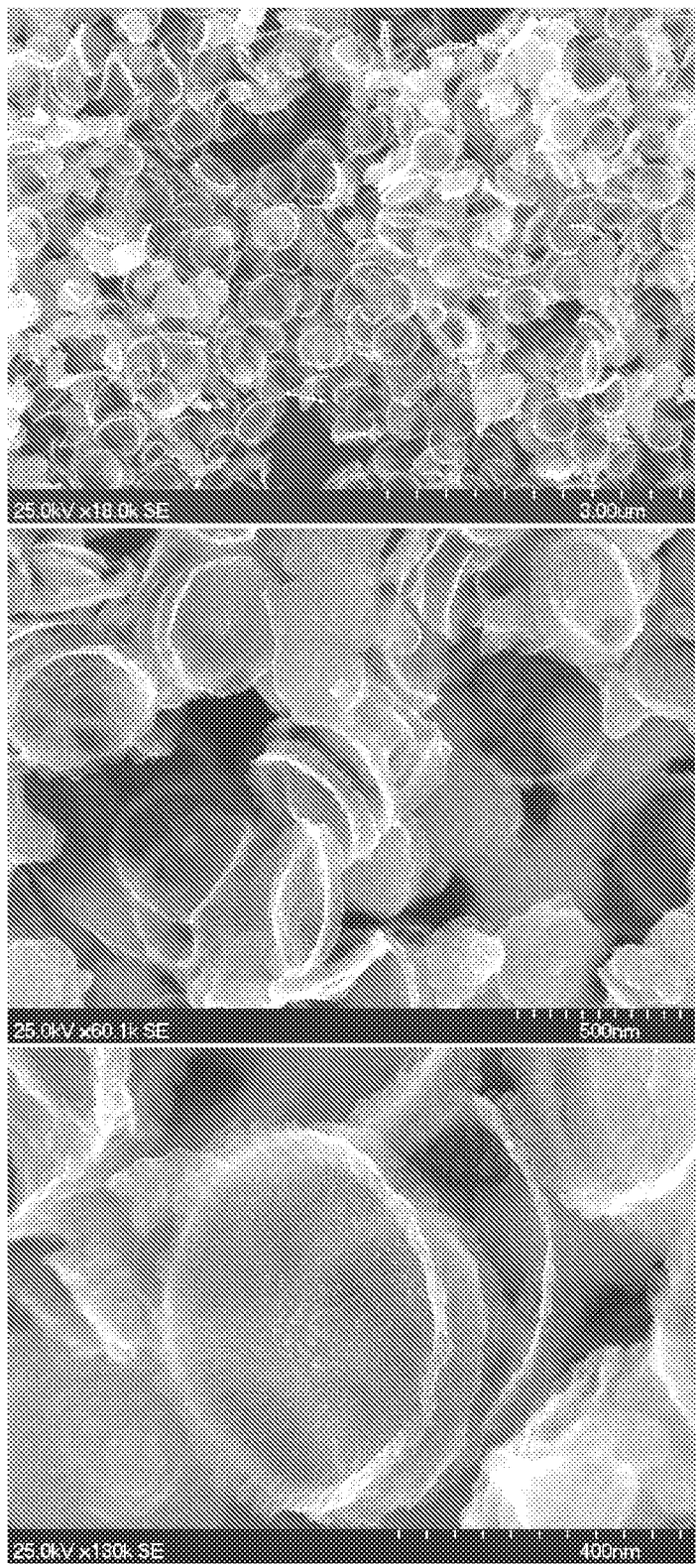
FIGS. 3a-c present scanning electron micrographs (SEMs) of washed rimmed metal nanodisks.

FIGS. 3a-3c present scanning electron micrographs (SEMs) of a collection of nanodisks that have been washed with ultrapure water to remove the catanionic surfactant template. The sample was loaded on a doped silicon wafer and rinsed with ultrapure water at least three times to remove as much surfactant and byproduct as possible before taking the SEM image.

FIGS. 3b and 3c are progressively greater enlargements of rinsed Pt nanodisks. The relatively monodisperse size of the nanodisks is apparent in FIG. 3a. FIG. 3c shows the hub and rim aspects of the rimmed nanodisks.

Figure 4A:
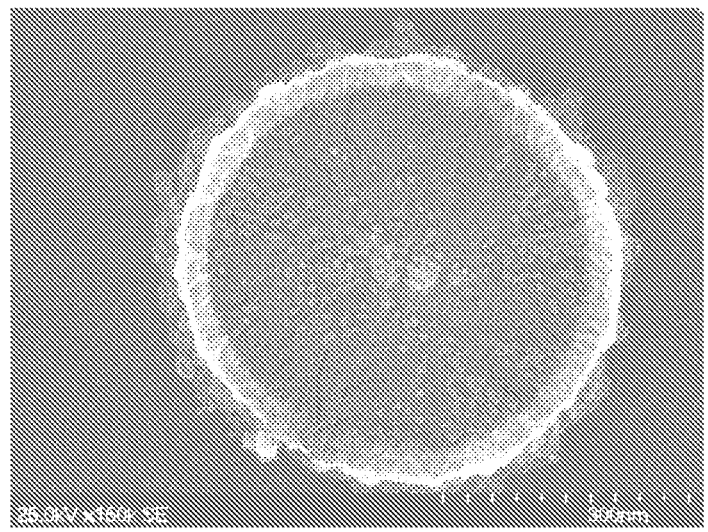
FIGS. 4a and 4b present a washed rimmed metal nanodisk showing the dendritic structure of the nanosheet region.
Figure 4B:
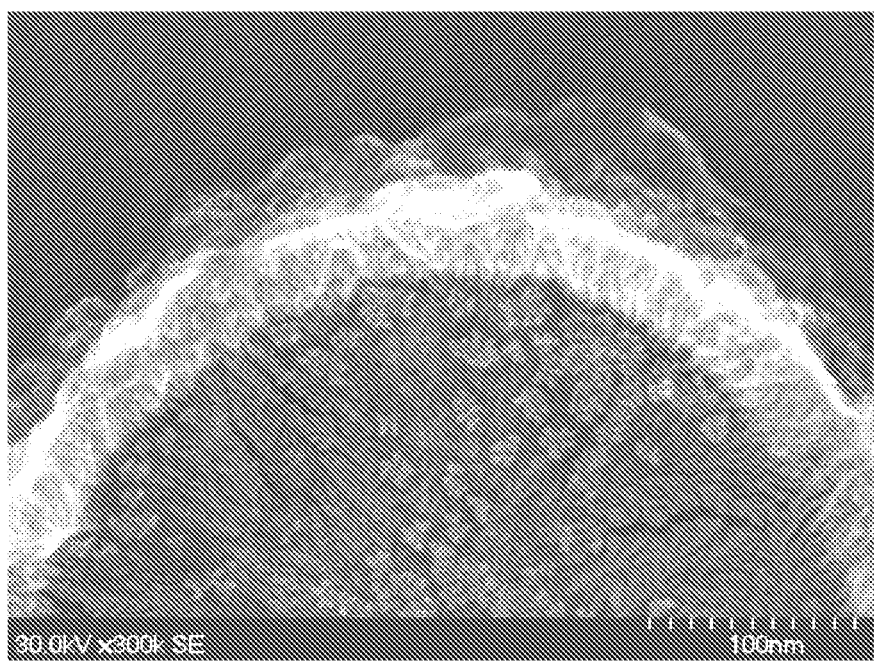

FIG. 4a is an SEM of an isolated rimmed nanodisk after rinsing with ultrapure water. FIG. 4b is an enlargement clearly showing the dendritic character of the region between the hub and the rim.

In various embodiments, the formation or nonformation of rims is controlled by properly balancing the availability of Pt ions for reduction relative to the supply of bicelles in which the reduction may take place. Two approaches may be used in various embodiments to control this: changing the number/size of bicelles and changing the concentration of metal salt/complex.

Figure 5A:
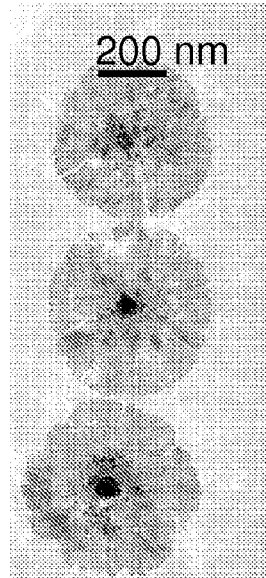
FIGS. 5a, 5b, and 5c present TEM images of unrimmed Pt nanodisks without rims.
Figure 5B:
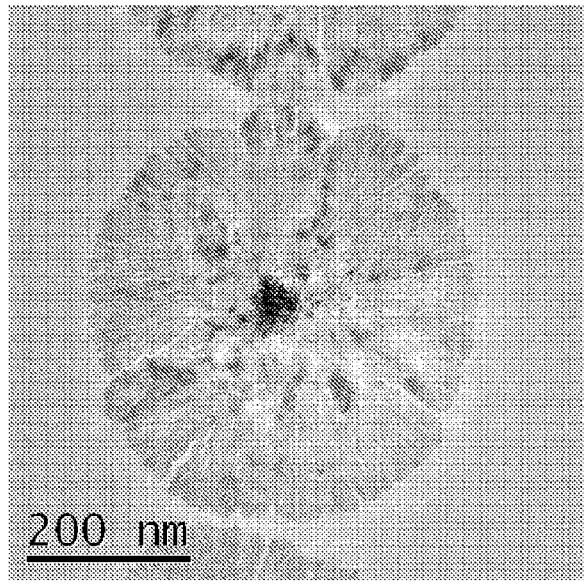
Figure 5C:
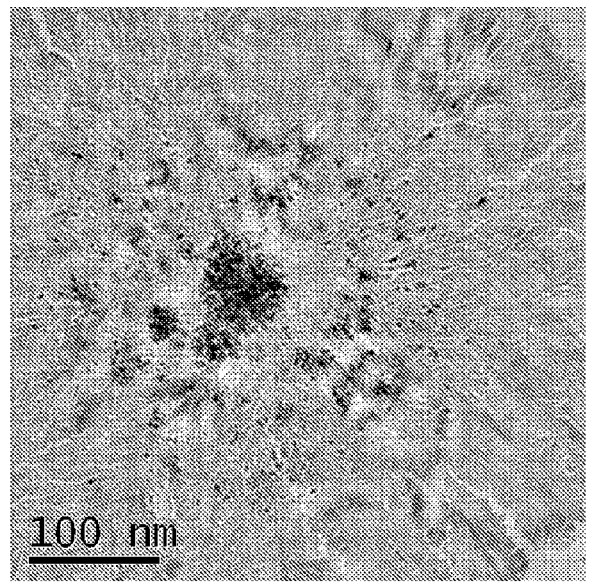

For embodiments where reduced concentrations of metal salt are employed, disks may be formed with a central hub and without the perimeter rim (FIGS. 5a and 5b) The growth radiates out from the central hub region. Formation of the rim can be prevented by limiting the supply of Pt to essentially stop the growth of the dendrites before reaching the edge region of the bicellar template. The dendritic nature of the metal is clearly seen in the TEM images of FIGS. 5b and 5c. For the nanodisks in FIG. 5a, the average diameter is approximately 469±45 nm.

For some embodiments where nanodisks without rims are formed, 5 mM aged $K_2PtCl_4$ stock solution, 0.5 mM CTAB and $FC_7$, and 75 mM ascorbic acid were reacted at 25° C. to form rimless nanodisks. For the embodiment illustrated in FIGS. 5a-5c, a 5 mM aged $K_2PtCl_4$ was used with 0.5 mM CTAB and $FC_7$ 75 mM ascorbic acid at a reaction temperature of 25° C.

Figure 6A:
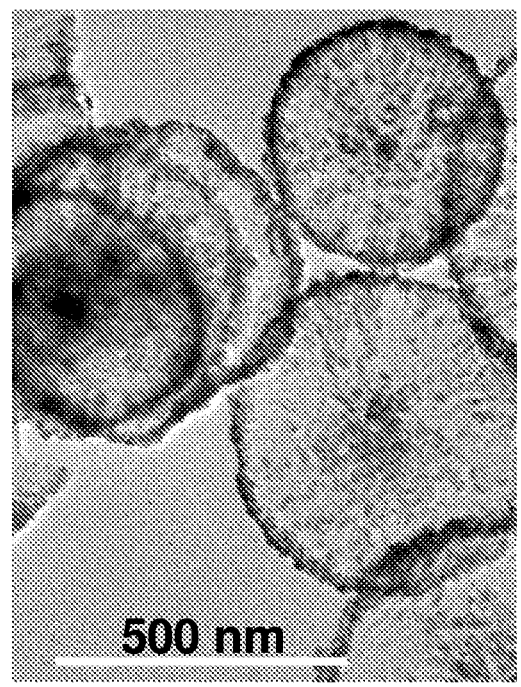
FIGS. 6a and 6b present TEM images of rimmed Pt nanodisks where the disk rim size is controlled by reaction temperature.
Figure 6B:
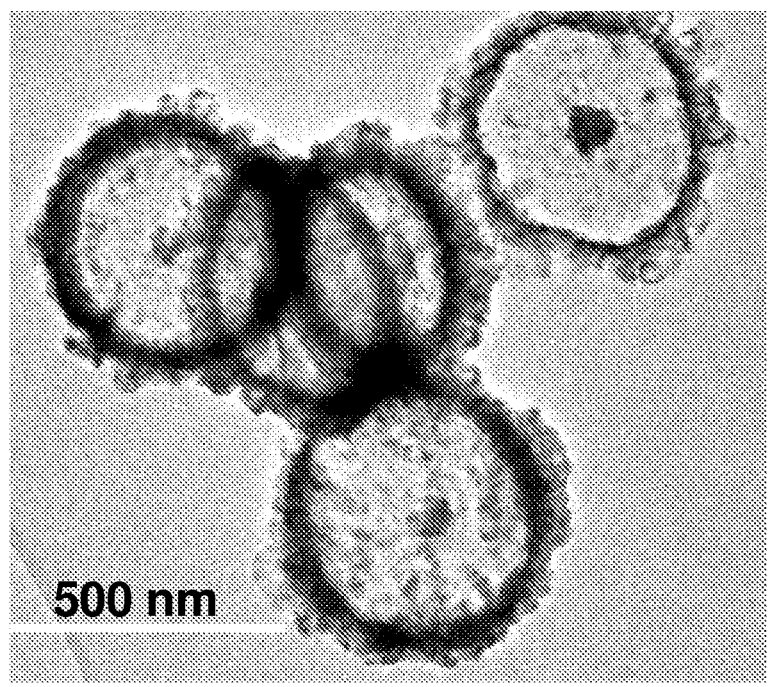

The reaction temperature influences the number of metal seeds that form within bicelles. Thus, adjusting the temperature of the solution can change the characteristics of the nanodisks. At higher temperatures, a higher number of seeds form. The growth of a higher number of nanodisks using a fixed amount of platinum (II) or (IV) source can result in the formation of unrimmed nanodisks when the metal ion supply is the limiting factor in the radial extension of the nanodisk. The size of the rim can also be controlled in a similar manner. For example, in an embodiments using a Pt(II) concentration of 10 mM, 0.5 mM CTAB and $FC_7$, and 75 mM ascorbic acid, performing the reaction at 30° C. produces nanodisks with small rims while performing the reaction at 20° C. produces nanodisks with larger rims. This is illustrated in FIGS. 6a and 6b.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:
1. A metal nanodisk, comprising:
a hub-like metal structure approximately at a center point of an approximately circular metal nanodisk; and a dendritic metal nanosheet extending radially out from the hub-like metal structure.

2. The metal nanodisk of claim 1, further comprising a rim-like metal structure circumscribing the dendritic metal nanosheet.

3. The metal nanodisk of claim 1, wherein the dendritic metal nanosheet is substantially uniform in thickness.

4. The metal nanodisk of claim 1, wherein the dendritic metal nanosheet is less than approximately 10 nm thick.

5. The metal nanodisk of claim 1, wherein a diametric dimension of the metal nanodisk is less than approximately 1000 nm.

6. The metal nanodisk of claim 5, wherein the diametric dimension of the metal nanodisk is greater than approximately 100 nm and less than approximately 1000 nm.

7. A method for making metal nanodisks, comprising:
combining an anionic surfactant and a cationic surfactant to form a solution of template bicelles;
combining the solution of template bicelles and a metal salt to form a reaction solution;
adding a reducing agent to the reaction solution; and
reacting the metal salt and the reducing agent to deposit metal within the template bicelles to form the metal nanodisks, wherein the metal nanodisks each comprise a hub-like metal structure approximately at a center point of an approximately circular metal nanodisk and a dendritic metal nanosheet extending radially out from the hub-like metal structure, and optionally a rim-like metal structure circumscribing the dendritic metal nanosheet.

8. The method of claim 7, further comprising removing the template bicelles from the metal nanodisks.

9. The method of claim 7, wherein the anionic surfactant and the cationic surfactant form a catanionic surfactant.

10. The method of claim 7, wherein the anionic surfactant is a salt of perfluorooctanoate or an alkyl sulfate salt.

11. The method of claim 7, wherein the cationic surfactant is selected from the group consisting of a cetylpyridinium salt, a benzalkonium salt, a benzethonium salt, polyethoxylated tallow amine, a cetyltrialkylammonium salt, a (1-octyl)trialkylammonium salt, a (1-decyl)trialkylammonium salt, a dodecyltrialkylammonium salt, a tetradecyltrialkylammonium salt, and an octadecyltrialkylammonium salt, wherein alkyl is methyl or ethyl.

12. The method of claim 7, wherein the reducing agent is selected from the group consisting of ascorbic acid and its salts, oxalic acid and its salts, malic acid and its salts, citric acid and its salts, ethylenediaminetetraacetic acid and its salts, triethanolamine, triethylamine, and nitrite.

13. The method of claim 7, wherein the metal salt is a selected from the group consisting of salts and complexes of Pt(II) and salts and complexes of Pt(IV).

14. The method of claim 7, wherein the metal salt is dissolved in a solvent to form a metal salt solution before combining with the solution of template bicelles.

15. The method of claim 14, wherein the metal salt solution comprises an aged platinum solution.

16. The method of claim 7, further comprising adjusting the temperature of the reaction solution to control the forming of the rim-like metal structure.

* * * * *